May 7, 1929. C. F. COUSINS 1,711,723

CASTER

Filed March 16, 1925

Inventor
Cordy F. Cousins
By Maréchal and Fehr
Attorneys

Patented May 7, 1929.

1,711,723

UNITED STATES PATENT OFFICE.

CORDY F. COUSINS, OF HAMILTON, OHIO, ASSIGNOR TO THE PHOENIX CASTER COMPANY, OF HAMILTON, OHIO, A CORPORATION OF OHIO.

CASTER.

Application filed March 16, 1925. Serial No. 15,884.

This invention relates to an improved type of caster, and more particularly to a caster comprising a roller bearing.

One of the principal objects of the invention is to provide an improved type of caster adapted for attachment to heavy objects such as factory trucks, or the like.

Another object is to provide a caster of this type which may be easily constructed, and is adapted to give long and satisfactory operation.

Other objects and advantages of the invention will be apparent from the description thereof set out below, when taken in connection with the accompanying drawing.

This application is a continuation in part of my application for Casters filed August 9, 1920, Serial No. 402,248.

In the drawings, in which like characters of reference designate like parts throughout the several views.

Figure 3:
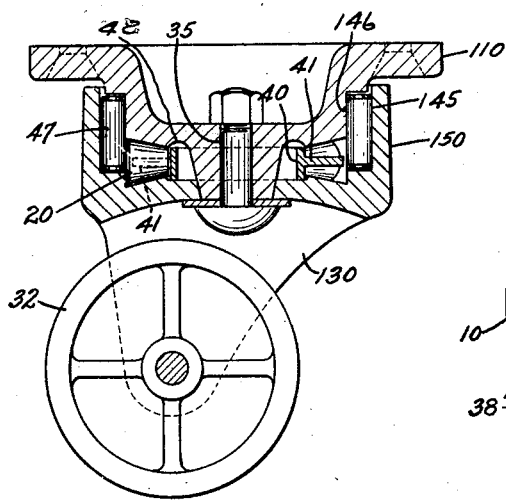
Fig. 3 is a view similar to Fig. 1 showing a second embodiment of the invention.

In the use of casters particularly casters of a size and type adapted for attachment to heavy objects such as factory trucks or the like, difficulty has been experienced in obtaining satisfactory operation thereof, even in the case of casters equipped with antifriction or roller bearings, owing to the tendency for the parts of the caster to tilt or to cock towards one side or another and thus throw the weight principally on a small part of the bearing elements and also cause binding of the moving parts, such binding action naturally having a tendency to restrict free movement of the caster. The present invention contemplates a caster so constructed and arranged as to effectively overcome the difficulty pointed out above.

In the drawing, the numeral 10 designates a caster plate by means of which the caster is attached to the truck or other object upon which it is to be used, lugs 11, having therein holes 12 adapted to receive attaching screws or bolts, being provided as an integral part of the caster plate. On the lower surface of the caster plate or extending downwardly therefrom is a circular flange 15. Also extending downwardly from the caster plate is a projection 16 having a passage 17 therein, the longitudinal axis of which substantially coincides with the central axis of the circular flange 15. This construction is such that the lower face of the caster plate has a circular groove therein lying between the circular flange 15 and the extension 16. This groove is adapted to house a plurality of tapered rollers 20, the face of the caster plate, within the groove, adjacent the base of the flange 15 being inclined to serve as a track or race 18 for said rollers.

Figure 1:
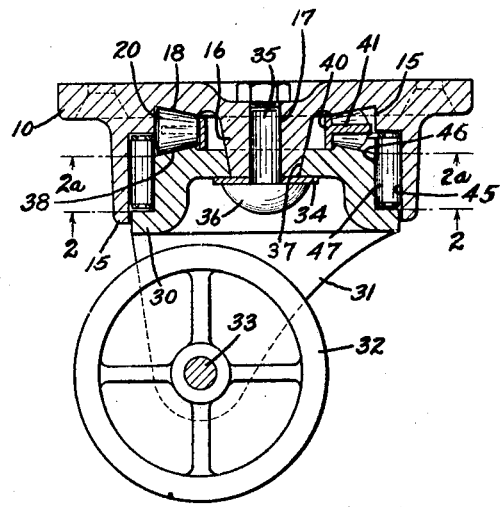
Fig. 1 is a longitudinal sectional view of a caster constructed in accordance with the present invention.
Figure 2:
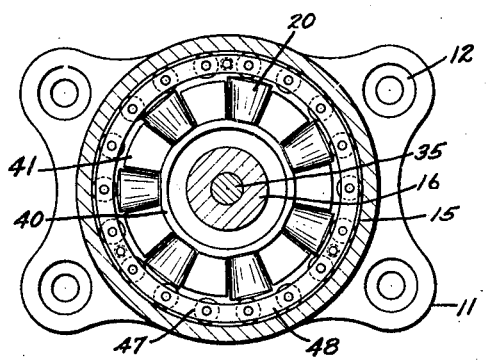
Fig. 2 is an irregular cross section taken on the lines 2—2 and 2ª—2ª of Fig. 1.

Adapted to cooperate with the caster plate 10 is a roller or wheel bearing plate 30 having a plurality of downwardly extending legs 31 adapted to receive a wheel 32 therebetween, and to support said wheel upon an axle 33, the wheel being freely rotatable upon said axle. The plate 30 has a passage 37 therethrough adapted to receive the lower end of the extension 16. The caster plate 10 and carrying plate 30 may be held in proper assembled relation by means of a bolt 35 the head portion 36 of which engages through the medium of a washer 34 the end of the extension 16 and the lower surface of the carrying plate 30 as best shown in Fig. 1. The bolt 35 may be secured in position by a nut threaded on the upper end thereof or by any other suitable means. The upper face of the plate 30 is inclined to form a track or race 38 for the rollers 20. The arrangement is such, that, when in assembled position, the tracks 18 and 38 are opposed to each other, with the rollers 20 therebetween, the device being held in properly assembled position by means of the bolt 35, the head 36 of which cooperates with the lower face of the plate 30 and the lower end of the extension 16 through the medium of washer 34 as already described.

A spaced member is provided which is adapted to hold the rollers 20 properly located and spaced. This member comprises a body portion 40, which is in the form of a ring, and a plurality of spaced outwardly extending fingers 41, the spaces between these fingers being of sufficient size to receive the rollers 20. The body portion 40 is adapted, when the device is in assembled position, to rest within the depression 42 in the upper face of the plate 30, to thus center this spacing member. The spacing member is so proportioned that the line of contact of the fingers 41 with the rollers 20 is substantially equidistant from the line of contact of the rollers with the tracks 18 and 38. That is, the fingers 41 contact with the rollers in such wise that their influence upon free rotation of these rollers is minimized.

As clearly shown in the drawing the rollers, and the parts of the caster cooperating therewith, are so proportioned that during operation there is very slight wear upon the parts, and long life is thus secured. Each of the rollers is frusto-conical in shape, and the rollers and the tracks 18 and 38 with which they cooperate, are so arranged that during operation of the caster each of the rollers, as it rolls, will travel in a circular path which is concentric with the circular flange 15. That is to say, as each of the rollers 20 rotates about its axis it will tend to travel in a circular path which is concentric with the inner wall of the circular flange 15. This insures a free travel of the rollers and substantially prevents any binding between the faces of the rollers and the cooperating wall of the circular flange 15. In order to secure this condition each of the rollers is formed as a frustum of a cone which has its apex within the central axis of the circular flange 15, the tracks or races 18 and 38 having their faces so inclined that they correspond with the faces of the cooperating rollers. In addition the larger base of each roller is curved and defined by a surface forming a part of the surface of a sphere concentric with the point within the axis of the circular flange 15 which serves as the apex of the cone defining each of the rollers 20, when these rollers are in assembled position. By giving the larger bases of the rollers this particular curvature, and so proportioning the rollers that each of them tends to roll along a track which is concentric with the circular flange, binding and sticking of the rollers and the cooperating face of the circular flange 15 is substantially prevented. In addition the edges of the rollers at the larger end are rounded so that, even though the rollers during operation, contact with the inner face of the circular flange 15 there will be very little resistance to free movement of the rollers and very little wear thereof.

By means of the above construction a caster is provided in which the rollers tend to travel freely around a circular path without undue contacting with the circular flange 15, which constitutes a retaining wall to hold those rollers in place. And because of the curvature which is given the larger base of those rollers any contact of the larger base of a roller with the cooperating inner face of the circular flange 15 is a line contact.

As best shown in Fig. 1 the flange 15 is extended downwardly and offset to provide an elongated cylindrical bearing surface 45, and a similar elongated cylindrical bearing surface is formed at 46 upon the carrying plate 30. Cylindrical roller bearings 47 are positioned in the annular space between the cylindrical bearing surfaces 45 and 46 to cooperate therewith. Ring or cage members 48 are connected with said roller bearings 47 to maintain the same in proper spaced operating position.

Fig. 3 shows a second embodiment of the invention having the same general arrangement of parts as illustrated in Fig. 1. In this form of the invention what may be termed the inner cylindrical bearing surface 146 is formed upon the caster plate 110 and the outer cylindrical bearing surface 145 is formed upon the carrying plate 130 by means of a flange 150 which extends upwardly from the carrying plate 130 and surrounds the roller bearings 47 and other parts of the caster as will be clear from Fig. 3. This construction lends itself to the better retention of lubricant about the several rollers.

From the foregoing it will be apparent that the present invention provides a caster having effective means for preventing the binding or cocking of the caster plate and carrying plate relative to one another. The relatively long cooperating cylindrical surfaces 45 and 46 and interposed roller bearings 47, which are preferably close fitting, prevent the carrying plate from assuming such an angle relative to the caster plate as to bind and prevent relative rotational movement thereof about its axis of rotation. The roller bearings 47 together with the antifriction bearings 20 reduce to a minimum all frictional resistance to the turning of the carrying plate 30 upon the caster plate 10. Not only does the construction described above permit of extremely easy and satisfactory operation of the caster, but it permits of simplicity in manufacture and assembly. The caster plate 10, the plate 30, the spacing member 40 and the rollers 20 may each be made by casting, each of these parts constituting a very simple type of casting. There may be some instances in which the tracks 18 and 38, and the rollers should be machined, but in ordinary practice the castings constituting these parts may be made of cast iron, the castings being made with sufficient nicety to permit of their satisfactory use without machining. It is obvious therefore that this invention permits of constructing, in a very cheap manner, a caster which is not only satisfactory in operation but is adapted to give long life.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A caster comprising a caster plate having a track on the lower face thereof, a circular flange about said track; a wheel bearing plate having a circular track on the upper face thereof; a plurality of tapered rollers between said tracks; a spacing member for holding said rollers in properly spaced relation between said tracks, said spacing member being provided with recesses adapted to receive the said rollers, without being directly connected thereto, and antifriction means including cooperating cylindrical surfaces for restraining relative lateral tilting movement of the said members.

2. A caster comprising a caster plate member, a wheel bearing member mounted for rotational movement upon the caster plate member, bearing surfaces formed on said members to provide a circular track for a plurality of frustro-conical rollers positioned between said members, said rollers and bearing surfaces being so tapered that their extensions intersect substantially at the axis of rotation of said members, spacing means for said rollers, a second set of cooperating bearing surfaces formed on said members, said latter bearing surfaces extending substantially parallel to the axis of rotation of said members and being positioned farther from said axis of rotation than the first mentioned bearing surfaces, cylindrical rollers carried between said latter bearing surfaces, and spacing means for said cylindrical rollers.

3. A caster comprising a caster plate member, a wheel bearing member mounted for rotational movement upon the caster plate member, bearing surfaces formed on said members to receive pressure in the direction of the axis of rotation of said members, anti-friction means between said bearing surfaces, spacing means for maintaining said anti-friction means in assembled operative relation, and means for restraining relative lateral tilting movement of said members, said means comprising cooperating concentric surfaces of revolution formed on said members and spaced farther from the axis of rotation of said members than said first-mentioned bearing surfaces, elongated roller bearings interposed between said last-mentioned surfaces, and means for maintaining said elongated roller bearings in spaced operating relation.

4. A caster comprising a caster plate having a circular track on the lower face thereof, a wheel bearing member having a circular track on the upper face thereof and a circular depression formed in said face within said track, one of said members having a circular flange about the exterior of said tracks, a plurality of tapered rollers between said tracks; a spacing member having an upstanding portion seating within said circular depression to hold the spacing member properly centered and having spaced fingers extending from said upstanding portions for holding said rollers in properly spaced relation, said fingers being adapted to receive the said rollers without being directly connected thereto, and means for holding the caster plate and wheel bearing plate in assembled operative relation.

5. A caster comprising a caster plate member, a wheel bearing member mounted for rotational movement upon the said caster plate member, bearing surfaces formed on said members to provide a circular track between said members, a plurality of frustro-conical rollers positioned between said members to operate on said track, said rollers and bearing surface being so tapered that their extensions intersect substantially at the axis of rotation of said members, said wheel bearing member having a circular depression formed therein within said circular track, spacing means positioned within said circular depression having outwardly extending spacing fingers positioned between but unconnected with said rollers, a second set of cooperating bearing surfaces formed on said members concentrically with said axis of rotation and spaced farther from the axis of rotation than said first-mentioned bearing surfaces, elongated cylindrical rollers carried between said last-mentioned bearing surfaces, and spacing means for said cylindrical rollers.

CORDY F. COUSINS.